United States Patent [19]

Hasenwinkle et al.

[11] Patent Number: 4,650,061
[45] Date of Patent: Mar. 17, 1987

[54] CROWDING LUG TRANSFER CONVEYOR SYSTEM

[75] Inventors: Earl D. Hasenwinkle, Puyallup; Frank Wislocker, Sumner, both of Wash.

[73] Assignee: Weyerhaeuser Company, Tacoma, Wash.

[21] Appl. No.: 815,671

[22] Filed: Jan. 2, 1986

Related U.S. Application Data

[63] Continuation of Ser. No. 718,815, Apr. 1, 1985, abandoned, which is a continuation of Ser. No. 397,955, Jul. 14, 1982, abandoned.

[51] Int. Cl.$^4$ ............... B65G 47/31; B65G 47/84
[52] U.S. Cl. .................... 198/461; 198/465.1
[58] Field of Search ............... 198/459, 460, 461, 462, 198/472, 478, 648, 465.1, 469.1, 473.1, 803.01, 803.2; 83/435.1

[56] References Cited

U.S. PATENT DOCUMENTS

| | | | |
|---|---|---|---|
| 2,263,811 | 11/1941 | Lipkin | 198/459 |
| 2,731,130 | 1/1956 | Blickenderfer, Jr. | 198/459 |
| 3,019,882 | 2/1962 | Pearson | 198/459 |
| 3,031,061 | 4/1962 | Rambo et al. | 198/459 |
| 3,370,549 | 2/1968 | Livingston | 198/465.1 |
| 3,382,965 | 5/1968 | Pierce, Jr. et al. | 198/461 |
| 3,722,656 | 3/1973 | Loomis, Jr. et al. | 198/472 |
| 3,767,025 | 10/1973 | Louis | 198/803.01 |
| 3,902,587 | 9/1975 | Checcucci | 198/459 |
| 3,934,701 | 1/1976 | Mooney et al. | 198/648 |
| 3,971,481 | 7/1976 | Longenecker et al. | 198/459 |
| 4,257,514 | 3/1981 | Ver Mehren | 198/459 |

FOREIGN PATENT DOCUMENTS

| | | | |
|---|---|---|---|
| 2253632 | 5/1974 | Fed. Rep. of Germany | 198/472 |
| 1428753 | 1/1966 | France | 198/459 |
| 2311734 | 1/1977 | France | 198/472 |
| 11581 | 1/1977 | Japan | 198/472 |

Primary Examiner—Joseph E. Valenza
Assistant Examiner—Daniel R. Alexander

[57] ABSTRACT

A crowding lug transfer conveyor system has an infeed and an outfeed end with a primary conveyor surface serving to a convey pieces therebetween. A plurality of lugs, each slideably mounted on a lug chain, are held at the infeed end and then released ahead of an incoming piece. An upstanding member on the lug is above the plane of the primary surface and the lug body is below the plane. A predetermined body length establishes the spacing and crowding distance at the outfeed end. Escapement mechanisms serve to release individual lugs on command both at the infeed and outfeed ends. At the outfeed end a plurality of lugs and pieces may be accumulated and spaced with the pieces then being metered in a singulated controlled manner. Caliper blocks in the lugs serve to grasp the lug chain when a lug is released with the lug chain continuously passing through the caliper blocks when the lug is being held in place awaiting release.

6 Claims, 8 Drawing Figures

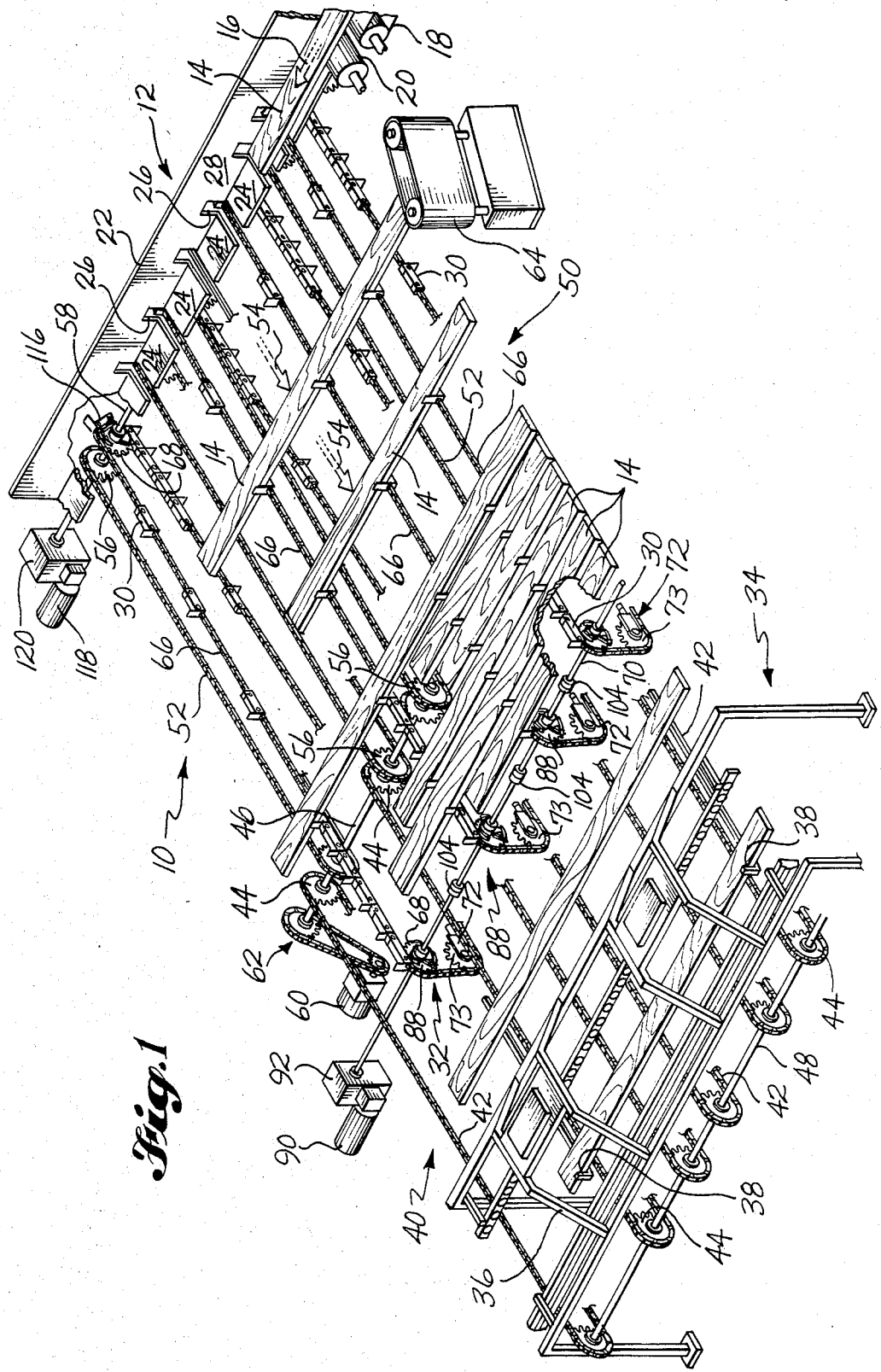

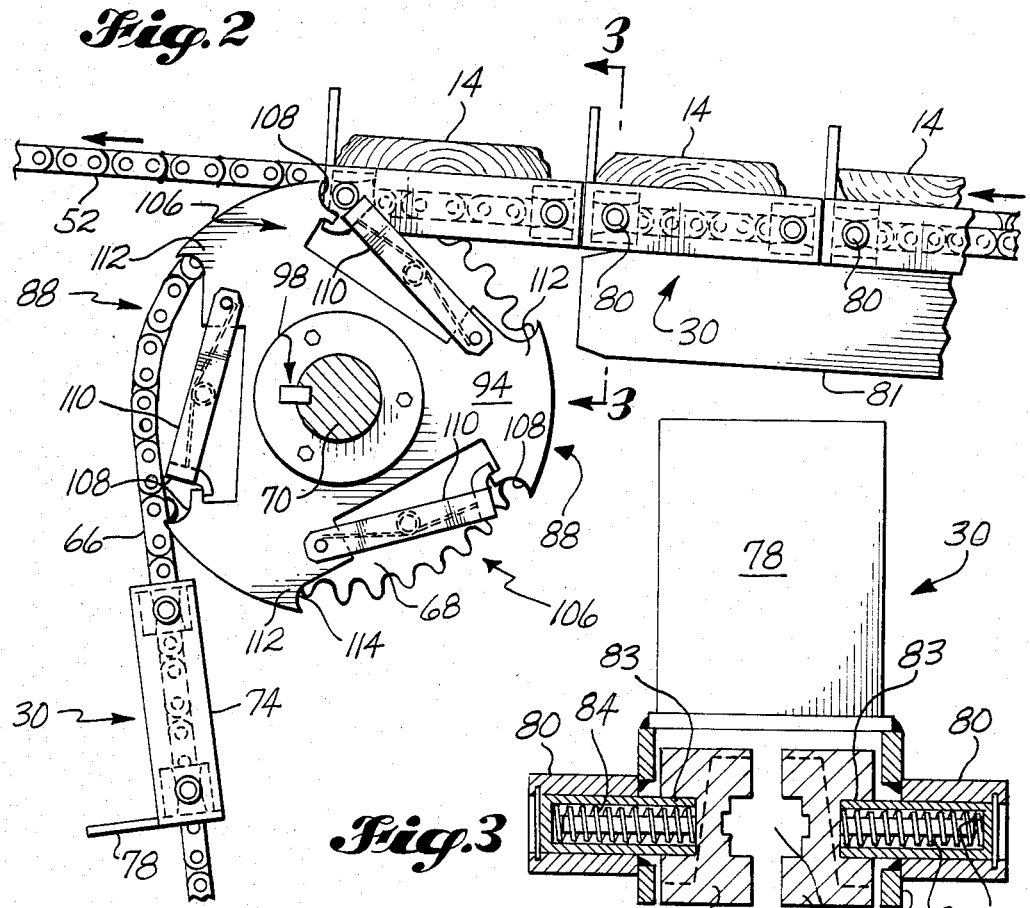

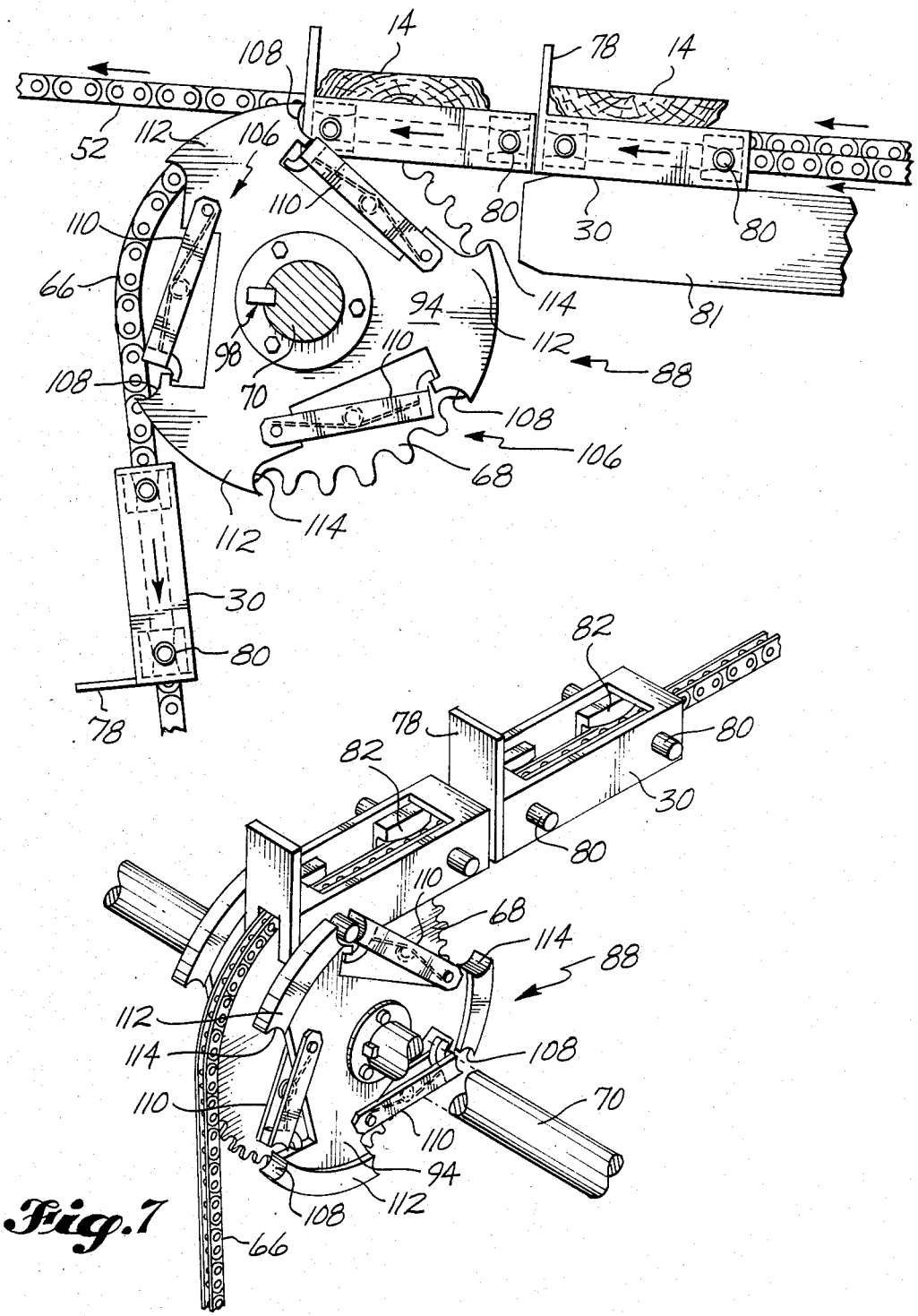

CROWDING LUG TRANSFER CONVEYOR SYSTEM

This application is a continuation of application Ser. No. 06/718,815, filed 4/01/85, now abandoned, which is a continuation of application Ser. No. 06/397,955, filed 07/14/82, now abandoned.

BACKGROUND OF THE INVENTION

This invention relates generally to material handling and more specifically to conveying and accumulation of work pieces such as boards or cants in a sawmill.

In modern high-speed sawmills, a typical example of an environment where the invention can be applied, logs are typically broken down into a plurality of separate elongated pieces at the machine center known as the primary breakdown system. As logs have been diminishing in size over the years, particularly in the diameter dimension, high-speed systems have necessarily been developed to maintain production and economic requirements. High-speed in-line breakdown processes are necessary; however, at the breakdown stations, separate pieces are simultaneously generated and they must be handled efficiently for further processing.

Typically, the primary breakdown system will generate at least one center cant and side boards, as well as slabs. A center cant is an elongated piece having two flat sides generated by saw lines and two curviliner surfaces being portions of the surface of the log. Cants are then normally directed to a secondary breakdown station where a plurality of individual pieces will be generated, usually having sizes approximating finished lumber sizes. While the cants from the primary breakdown station can continue in line to the secondary cant breakdown station, it is more common for them to undergo a lateral transfer before reaching the secondary cant breakdown station. It is the lateral transfer function where the present invention may be utilized within the sawmill environment.

Side boards are similar to cants in that they normally have two flat surfaces and two curvilinear surfaces, although they are generally thinner and normally proceed to a secondary board breakdown station known as an edger. At the edgers, the side boards are fed linearly through the secondary breakdown system where the two curvilinear side edges are removed either by sawing means or chipping means. The boards flowing out of an edger will usually have a cross-sectional size approximating the finished lumber size. Just as cants normally undergo a lateral transfer from the primary breakdown station, side boards are also transferred laterally to an edging station before being fed linearly through the edger. Slabs, having one flat surface and one curvilinear surface, can be processed in a manner similar to cants and side boards with respect to material handling, specifically via a lateral transfer system to a secondary slab breakdown station where available boards can be generated from the slabs.

A problem in a sawmill in the past has been material handling associated with the high piece counts in the lateral transfer functions. In order to generate maximum production at the primary breakdown station, it is necessary to process the optimum number of logs per unit of time. In modern high-speed mills, piece counts through the primary breakdown system may approach ten per minute. In a typical high-speed facility, if two side boards are generated from each log, the side board material handling and downstream processing system would necessarily be designed to process twenty side boards per minute. Since side boards are elongated and difficult to handle, the piece count needed to be handled is a difficult problem. Oftentimes, with such a high piece count, the boards accumulate too rapidly and overlap, thereby causing pileups, severe skewing and jam-ups. Unscramblers were necessary to attempt to continuously handle the pieces and singulate them for efficient processing at the edger.

In order for the edger to operate at its optimum production capacity, individual side boards must be available continuously at the edger infeed station in a singulated, even-ended and non-skewed orientation. The consequences from inefficient handling in a lateral transfer function are downtime while removing jam-ups and lower productivity through the secondary breakdown stations. Similar problems occurred in the cant lateral transfer function, as well as with the lateral transfer function for slabs. Ideally, side boards, cants and slabs will be available to the infeed station of each respective machine center in a singulated, even-ended and non-skewed orientation on a continuous basis. To ensure such a supply of elongated pieces at each machine center, a crowding and accumulating means is desirable in the lateral transfer function so that on demand there is always a properly oriented piece for movement into the respective machine center. By continuously having an accumulated supply of singulated and properly spaced elongated pieces ahead of each machine center's infeed station, then each machine center can operate at its optimum production capacity.

Accordingly, from the foregoing, it is an object of the present invention to reduce material handling problems in a transfer conveyor.

It is a further object to increase productivity through a downstream processing station.

It is yet another object to increase the productivity of an upstream processing station by reducing downtime from downstream material handling problems.

It is still a further object to provide an accumulation of pieces ahead of a processing station in a proper singulated, even-ended, and non-skewed orientation so that continuous flow can proceed through the processing station.

These and many other objects of the present invention will become apparent upon reading the detailed description to follow in conjunction with the attached drawings.

SUMMARY OF THE INVENTION

Briefly stated, the present system invention is practiced in one form by positioning an endless lug chain about sprockets with the sprockets being mounted at the infeed end and the outfeed end of a crowding lug transfer conveyor. The crowding lug conveyor incorporates a plurality of lugs slidably mounted on the endless chain and each has an upstanding lug plate mounted on a uniformly sized spacer body with guide pins and caliper blocks on the body. The plane of the endless chain and spacer bodies is just below the plane of the primary conveyor surface supporting the pieces in the transfer conveyor. The spacer bodies have a length dimension that is designed to be greater than the average width dimension of the pieces to be transferred, crowded and metered from the outfeed end. Escapement mechanisms are mounted adjacent the sprockets to hold and index the lug assemblies on command. Upon release at the infeed end, the caliper blocks will, by friction, allow a lug assembly to travel with its endless chain. At the outfeed end, the escapement mechanism operates to meter a piece to the downstream process by causing the lugs to again be indexed, one at a time from those crowded together at the outfeed end. The lugs return from the outfeed end to the infeed end on the endless lug chain where they are held ready for indexing below the plane of the primary conveyor surface. At the outfeed end, a number of individual pieces can be crowded together in a spaced manner and then metered one by one to the next downstream processing station. The present distance between adjacent upstanding lug plates normally provides a uniform spacing between pieces and therefore more efficient transfer and handling.

DESCRIPTION OF THE DRAWINGS

FIG. 1 is a perspective view showing the overall arrangement of the crowding lug transfer conveyor in a typical environment.

FIG. 2 is a side elevation at the outfeed end showing detail of the slideable lugs and escapement mechanism.

FIG. 3 is a sectional view taken along line 3—3 of FIG. 2 and shows the cross-sectional detail of a lug assembly.

FIG. 4 is a view similar to FIG. 2 and shows the outfeed escapement mechanism as it is indexed, thereby metering one piece to a downstream process.

FIG. 5 is another view similar to FIG. 2 and shows the outfeed escapement mechanism as the next incoming lug assembly impacts the stops on the rotatable escapement wheel.

FIG. 7 is a perspective view showing several lugs accumulated at an outfeed escapement mechanism.

DESCRIPTION OF THE PREFERRED EMBODIMENT

Figure 6:
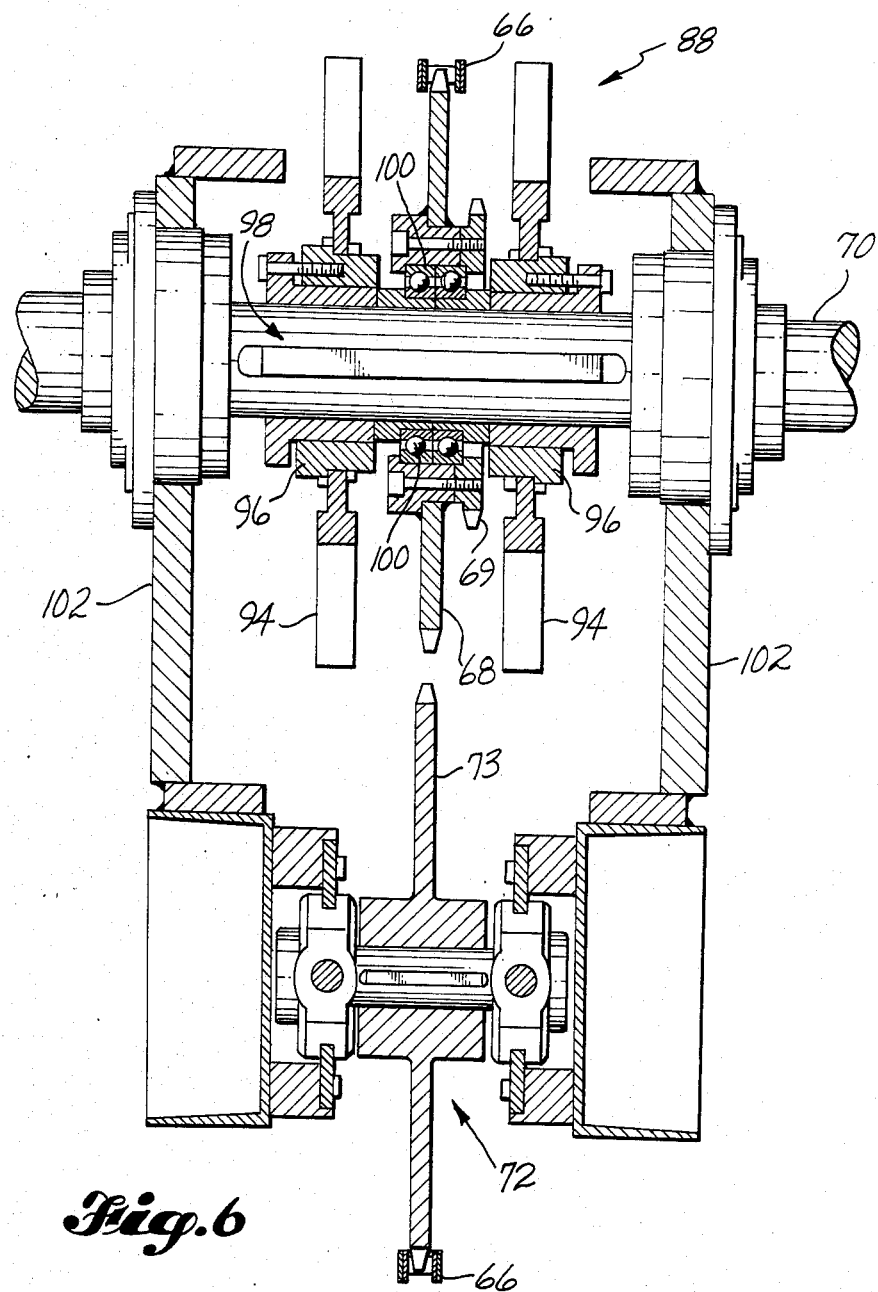
FIG. 6 is a detailed end elevation view of the outfeed end showing an outfeed escapement mechanism.
Figure 8:
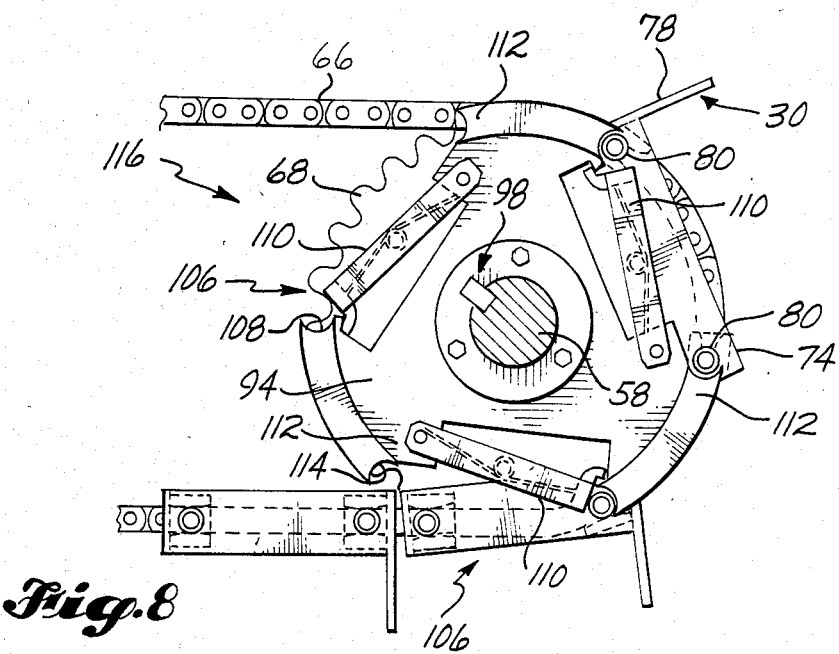
FIG. 8 is a view similar to FIG. 2 except showing the infeed escapement mechanism.

Referring first to FIG. 1, a general description will be given to specify the major structural and functional features of the crowding lug transfer conveyor system, which is generally indicated at 10. The infeed end of the transfer conveyor is generally indicated at 12 and, in the embodiment shown, has elongated pieces 14, such as unedged sideboards generated from an upstream primary breakdown station (not shown), being fed to conveyor system 10 longitudinally. The boards 14 are fed linearly in the direction of flow arrow 16 by any suitable conveyor 18. A last feed roll 20 provides the final longitudinal conveying means to direct each incoming piece onto conveyor system 10. The structure 22 provides support surfaces 24 for each piece to impact and slide on until they rest atop transfer conveyor 10. A plurality of cutouts 26 are provided in upstanding backwall 28 in order to accommodate the travel of the lugs, each indicated generally as 30, as a set is indexed ahead of an incoming piece.

In the sawmill application, dimensional and structural requirements will be determined based primarily on the length and width of the boards to be handled and conveyed by the system. For example, in a typical sawmill, side boards coming from the primary breakdown station can be on the order of 8-24 feet in length and 3-24 inches in width. As pointed out in the background, a substantial number of side boards are generated in a typical high speed mill and the handling systems must be capable of effectively accepting, conveying and outfeeding the required number. In addition, since the individual pieces can vary greatly in their dimensions, the handling system must be versatile enough to handle pieces of the dimensional ranges expected. While the embodiment depicted shows boards 14 flowing longitudinally to infeed end 12 for lateral transfer, the boards could also approach infeed end 12 from a transverse direction as will be apparent to those skilled in the art. It is also apparent that for elongated pieces a plurality of sets of lugs 30 will be necessary with the sets being spaced apart.

Spaced transversely from infeed end 12 a distance sufficient to provide the functional requirements, as will become apparent, is outfeed end generally indicated at 32. At outfeed end 32, a plurality of pieces 14 are shown where they have been accumulated and crowded in spaces provided by sets of lugs 30 as will be further described. As pieces 14 are called for by the downstream process station, generally indicated at 34, the outfeed indexing means on transfer conveyor system 10 is activated to meter an individual board from outfeed end 32. As depicted, process 34 represents a scanning station where each board is electro-optically scanned to determine its dimensions. An overhead scanning frame 36 supports a portion of the scanning system and a pair of pin stops 38 can serve to hold the board during actual scanning. A typical transfer conveyor 40 comprised of endless chains 42 on sprockets 44 mounted on spaced shafts 46, 48 serves to convey the individual pieces 14 as they are metered from outfeed end 32 to the scanning station. The sprockets on shaft 46 will usually be idler sprockets while those on shaft 48 will be driven. From the scanning station, the board is then directed to the downstream edging station (not shown) where its rough edges are removed, the edging lines having been determined through the scanning system and a computer implemented decision and control system. Usually the boards will be fed linearly through the edging station after they are scanned and positioned relative to the edging means.

The crowding lug transfer conveyor 10 is comprised of a substantially typical conveyor surface 50 consisting, in part, of a plurality of spaced endless chains 52. The top flight of chains 52 forms a conveying plane atop which the pieces 14 will be supported and conveyed. Flow arrows 54 indicate the direction of flow. Endless chains 52 are trained about sprockets 56 which are mounted on spaced shafts 46, 58. The sprockets 56 are fixedly mounted on shaft 46 and are rotated through shaft 46 which is powered by motor 60 and driven means 62. In the usual operating mode, motor 60 will continuously turn shaft 46 to continuously drive chains 52. The sprockets 56 mounted on shaft 58 will be idler sprockets. As pieces 14 are conveyed transversely atop conveyor surface 50, an even ending belt 64 is continuously operating to position each piece with one end on a common plane. Any commercially available even-ending means can be used to accomplish the function.

Still referring to FIG. 1, a plurality of endless lug conveyor chains 66 are spaced from each other and from endless chains 52. Chains 66 are trained about sprockets 68 which in turn are mounted on spaced shafts 70, 58. Sprockets 68 on shaft 58 are idler sprockets, not being driven by the shafts on which they are mounted. The sprockets 68 on shaft 70 are driven as will be explained. Each sprocket 68 has a diameter which is sized so that the top flight of each lug chain 66 forms a horizontal plane that is slightly below the plane of conveying surface 50. The length of lug conveyor chains 66 determines the dimension of transfer conveyor 10 between infeed and outfeed ends 12, 32. Serving to drive lug conveyor chains 66 is motor 60. Drive shaft 46 is interconnected through a suitable chain drive and sprocket means (not shown) to sprockets 68 providing rotational movement to them. Drive sprockets 69 (see FIG. 6), fixed to the sprockets 68 on shaft 70, are driven thereby turning sprockets 68. Each endless chain 66 will travel at a speed substantially equal to the speed of chains 52.

Positioned below and in line with each sprocket 68 on shaft 70 are chain tensioning devices, each indicated at 72. In the embodiment depicted, the device is shown as being a pneumatically loaded sprocket wheel 73 around which its respective endless chain 66 will travel. While it is desirable to provide a continuous tensioning means for the lug chains 66, it is not absolutely necessary and will not be further described.

Turning now to FIGS. 2–8, a detailed description will be given of the lugs 30 and their feeding, transfer, and indexing structure. Each lug chain 66 has a predetermined number of lugs slideably associated therewith. As an example, in the application where side boards are being conveyed by conveyor system 10 from a primary breakdown station to a downstream processing station, thirty lugs have been determined adequate to provide the desired capacity. The transfer distance from shaft 58 to shaft 70 and the desired spacing between pieces will determine the number of lugs for the particular application.

Each lug has a body portion 74 through which chain 66 can slideably travel. The chain passage is generally indicated at 76 in FIG. 3. The body length is predetermined and is based on the average largest width piece that must be transported by the transfer conveyor. Even if an occasional piece is wider than the body length, the system is capable of functioning in the intended manner. Extending upwardly from the leading end of each lug body 74 is the upstanding lug member 78. Lug members 78 extend upwardly above the plane of conveyor surface 50 a distance that is approximately one to two times the thickness dimension of the pieces being handled and transferred. Laterally spaced at each end of lug body 74 is a pair of opposed guide pins, each pin being indicated at 80. The guide pins 80 are attached to the outer sides of body 74 and serve, in part, to support and guide each lug during its travel along the upper run of chain 66. A pair of guide channels or other suitable guide means, each indicated at 81, extend from the infeed to the outfeed end along each side of lug chain 66 and serve to support and guide the pins 80 as a lug travels.

Pivotally mounted within each lug body 74 on support pins 83 and at each end are opposed chain caliper blocks, each indicated at 82. The caliper blocks 82 are designed to engage, on a continuous contact basis, the endless chain 66. Serving to cause continuous engagement of the caliper blocks 82 with lug conveyor chains 66 are biasing springs 84 mounted within the hollow portion 86 of pins 80. Springs 84 exert a calipering force about chains 66 at the leading and trailing ends of the lug bodies. The force, approximately 2–6 lbs., is sufficient to cause a frictional gripping action on chain 66, causing the lug to travel with the lug chain along guide channels 81. The engagement pressure is, however, designed to allow the chain to continuously slide through the caliper blocks 82 when a holding force is applied to a lug as will become more apparent shortly. It has been determined that a suitable material offering long wear characteristics for caliper blocks 82 is a commercially available ultra high molecular weight polyethylene composition. It can be machined and wears well from lug chain sliding contact.

Turning now to a description of an outfeed indexing and metering assembly or escapement mechanisms, each generally indicated at 88, particular reference will be made to FIGS. 1, 2, and 4–7. As can be seen in FIG. 1, in a sawmill application for the transverse crowding and conveying system, there are four separate metering assemblies at outfeed end 32. Each assembly 88 is driven from common shaft 70 through a motor 90 and indexing driven means 92.

Fixedly mounted on shaft 70 are spaced pairs of escapement plates, each plate indicated as 94. A pair of plates 94 is mounted near each side of a sprocket 68 on hubs 96 and are fixed to shaft 70 with a key assembly generally indicated at 98. As can be seen when referring to FIG. 6, sprockets 68 are mounted on shaft 70 with bearings 100 so they are free to rotate independently of plates 94. A modularized structure as depicted in FIG. 6 can be provided with supporting structure 102 holding chain tensioning devices 72 together with sprockets 68 and escapement plates 94. Shaft 70 will be split between metering assemblies with couplings 104.

Each plate 94 is designed to provide a plurality of uniformly spaced holding and conveying units 106 functional to first hold and then convey and release one pin on one side of a lug 30. Units 106, as depicted in the Figures, are so positioned on their respective plates so that in each pair of plates on either side of a sprocket 68 they are laterally in line in order to act on the forward two pins 80 on each side of a lug 30. Each plate is sized and structured to provide a plurality of forward impact and holding areas 108 which, in the embodiment depicted, include the spring loaded latching mechanisms 110 for positive conveying. At the back end 112 of units 106 is rear impact and pusher member 114 designed to impact and push a back pin on lug 30. A pair of members 114 will impact the pair of opposed back pins on a lug and index the lug around the metering assembly to a position where it will be released to travel with its lug chain back to the infeed end 12.

At the infeed end 12 (an infeed indexing assembly is depicted in detail in FIG. 8) a plurality of lugs 30 will be accumulated on the bottom run of a lug chain 66 with the chain continuously passing through caliper blocks 82. When boards 14 approach conveyor surface 50, a set of lugs will be released or indexed each to travel on its respective lug chain ahead of each board before they individually come to rest atop surface 50. The infeed indexing assemblies or escapement mechanisms, generally indicated at 116, are constructed substantially similarly to outfeed metering assemblies 88. A separate motor 118 and index drive means 120 rotate shaft 58 to release lugs 30 at each infeed assembly 116 on command. At infeed end 12, the lugs 30 are held below the plane of conveyor surface 50 until a set of lugs is released, at which time the upstanding members 78 move upwardly to a position where they rise above the boards and maintain the desired spacing between boards. Once released, each lug chain 66 will carry its lug 30 until it impacts the last accumulated lug at outfeed end 32. At outfeed end 32, a plurality of separated crowded boards can be maintained in queue and metered as needed by the downstream process by metering assemblies 88.

While the operation of the invention is apparent from the foregoing detailed description and drawings, a sequencing of elements through a cycle will be described. Single boards are fed to conveyor surface 50 at the infeed end 12. As a single board approaches surface 50, a suitable detection means (not shown) will generate a signal to cause motor 118 to index the infeed indexing assemblies 116 one position. One set of lugs 30 will be released and each lug chain 66, through the force from caliper blocks 82, will propel a lug down conveyor surface 50 ahead of the board. At outfeed end 32, the traveling board will impact the upstanding members 78 of the set of lugs which will be abutting the set of lugs accumulated and held from the previous cycle. Each set of lugs that are accumulated upstream from assemblies 88 will be uniformly spaced as determined by the length dimension of lug bodies 74. Since chains 52 continue moving, each board will abut and be crowded against the downstream set of upstanding lug members 78. Lug chains 66 are also in continuous motion and when the lugs are being held by the metering assemblies, they slide through caliper blocks 82.

When the downstream process calls for a board, a signal is sent to drive means 92 and shaft 70 is caused to rotate. The acceleration is controlled through drive means 92 to move the last set of lugs 30 in a desired manner. Once the escapement plates 94 are rotated, the set of lug members 78 holding the board to be metered are caused to move downwardly, thereby releasing a single board. Simultaneously, a set of lugs is indexed and released from the metering assemblies. The lug chains and grasping caliper blocks cause the released set to return to the infeed end. FIGS. 2, 4, 5, 7 and 8 depict the transfer conveyor system at various points in its cycle.

While a detailed description of the invention and an operative cycle has been given, it may occur to those skilled in the conveying art to make modifications. All such modifications are intended to be included within the scope of the appended claims.

We claim:

1. In a crowding lug transfer conveyor including an infeed end and an outfeed end with a primary conveyor surface therebetween including means for depositing pieces atop the conveyor surface at the infeed end and for accepting the pieces downstream from the outfeed end, the improvement comprising:

at least one endless chain adapted to be continuously driven and having its top run below the plane of the primary conveyor surface and extending between the infeed and outfeed ends, a plurality of lugs mounted about the endless chain and moveable with respect thereto in a slidable relationship and having upstanding members extending upwardly above the plane of the primary conveyor surface as a lug is moving with its endless chain along the top run, said lugs having body portions with a predetermined length to establish a predetermined spacing between the upstanding members when two or more lugs are abutting one another.

at least one front and one back pair of opposed caliper blocks on each lug having means for frictionally engaging the blocks against the sides of the endless chain thereby causing the lug to travel until a force counteracts the frictional gripping force allowing the chain to slide relative to the caliper blocks, said caliper blocks being pivotally mounted on the lugs, means at the infeed end to hold and then release individual lugs to travel with its endless chain toward the outfeed end, and means at the outfeed end to hold and then release individual lugs to travel with its endless chain back to the infeed end.

2. The improvement as in claim 1 including a plurality of endless chains spaced from each other with each chain having a plurality of lugs mounted thereon adapted to function as spaced apart sets of lugs.

3. The improvement as in claim 2 further including means for tensioning the endless chains and maintaining the tension within a predetermined tension range.

4. The improvement as in claim 2 further including guide means associated with the lugs for causing the lugs to travel in a predetermined path.

5. The improvement as in claim 2 in which the means for holding and releasing the lugs at the infeed and outfeed ends comprise rotary escapement plates driven on command for impeding, conveying, and releasing lugs.

6. The improvement as in claim 5 in which the escapement plates operate to release one set of lugs causing them to travel with their respective endless chains to the infeed or outfeed end where they will be held until released.

* * * * *